(12) United States Patent
Tsai (10) Patent No.: US 8,720,285 B2
(45) Date of Patent: May 13, 2014

(54) NON-CONTACT MEASUREMENT SIGNAL TRANSMISSION SYSTEM AND METHOD THEREOF

(75) Inventor: Jian-Feng Tsai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 197 days.

(21) Appl. No.: 13/081,316

(22) Filed: Apr. 6, 2011

(65) Prior Publication Data

US 2012/0152035 A1    Jun. 21, 2012

(30) Foreign Application Priority Data

Dec. 17, 2010    (TW) .............................. 99144616 A (51) Int. Cl.
| G01L 1/00 | (2006.01) |
| G01L 1/12 | (2006.01) |
| G01L 1/25 | (2006.01) |

(52) U.S. Cl.
USPC ................. 73/862.541; 73/862.68; 73/862.69

(58) Field of Classification Search
USPC ........................................ 73/862.541, 68, 69
See application file for complete search history.

(56) References Cited

U.S. PATENT DOCUMENTS

| 6,196,347 | B1 | 3/2001 | Chao et al. |
| 6,886,416 | B2 | 5/2005 | Tsay et al. |
| 6,964,203 | B2 | 11/2005 | Crasset |
| 7,726,205 | B2 | 6/2010 | Meyer et al. |
| 2010/0180718 | A1 | 7/2010 | Liu et al. |

FOREIGN PATENT DOCUMENTS

| CN | 1864343 A | 11/2006 |
| TW | 404914 B | 9/2000 |
| TW | 455682 B | 9/2001 |
| TW | 491939 B | 6/2002 |
| TW | 493746 U | 7/2002 |
| TW | I233906 B | 6/2005 |
| TW | M326504 U | 2/2008 |
| TW | M336218 | 7/2008 |
| TW | M339677 | 9/2008 |

OTHER PUBLICATIONS

State Intellectual Property Office of the People's Republic of China, "Office Action", China, Feb. 22, 2013.
Lin et al., An Observer for the Bicycle Pedaling Torque and Consumed Energy Estimation, Journal of Technology, 2008, pp. 209-216, vol. 23, No. 4.
Zhou, Design and Implementation of a Cost-Effective and High-Performance Control System for an Electric Assisted Bicycle, Thesis, 2003, National Chung Hsing University.
Hull, Measurement of Pedal Loading in Bicycling: I. Instrumentation. J. Biomechanics 1981, pp. 843-856, vol. 14, No. 12.

*Primary Examiner* — Lisa Caputo
*Assistant Examiner* — Brandi N Hopkins
(74) *Attorney, Agent, or Firm* — Morris Manning & Martin LLP; Tim Tingkang Xia, Esq.

(57) ABSTRACT

A non-contact measurement signal transmission system for a wheeler device includes a detection device, a magnetic coupling device, and a pressure sensing device. The detection device is disposed on a body of the wheeler device, and is used for generating an alternating current (AC) signal. The magnetic coupling device includes a first primary side and a first secondary side. The magnetic coupling device receives the AC signal at the first secondary side and emits a magnetic coupling signal from the first primary side. The pressure sensing device disposed on a rotator receives the magnetic coupling signal, and includes a forced portion and a base. The pressure sensing device responds a feedback signal according to a relative displacement between the forced portion and the base after receiving a press of a user. The detection device outputs a forced signal according to the feedback signal.

11 Claims, 12 Drawing Sheets

NON-CONTACT MEASUREMENT SIGNAL TRANSMISSION SYSTEM AND METHOD THEREOF

CROSS-REFERENCE TO RELATED APPLICATIONS

This non-provisional application claims priority under 35 U.S.C. §119(a) on Patent Application No. 099144616 filed in Taiwan, R.O.C. on Dec. 17, 2010, the entire contents of which are hereby incorporated by reference.

BACKGROUND OF THE DISCLOSURE

1. Field of the Disclosure

The present disclosure relates to a measurement signal transmission system and a method thereof, and more particularly to a non-contact measurement signal transmission system and a method thereof, which are applied between a body and a rotator of a wheeler device.

2. Related Art

With the prevalence of energy saving and carbon reduction and lifestyles of health and sustainability (LOHAS), the bicycle industry develops vigorously. To improve the convenience of use in daily life, electric bicycles with electric power assistant systems gradually become the mainstream.

The electric power assistant systems are classified into two categories, one in a passive form and the other one in an active form. The system in a passive form directly receives of the command from a rider, and correspondingly provides the driving torque to a bicycle. The system in an active form measures a force applied by a rider to a pedal of a bicycle according to an additional detection device, and provides a required auxiliary force.

However, after the force applied to the pedal of the bicycle is converted into a signal, the signal must pass through at least two rotation surfaces (a rotation surface between the pedal and a crank and a rotation surface between the crank and a frame) and then to a circuit on the frame. For this purpose, brushes are disposed on the rotation surfaces. Modification of the tooth plate in a bicycle is required for this design such that the structure of the bicycle becomes more complex.

On the other hand, transmission in a wireless manner, for example, using a Bluetooth transmission device, is proposed conventionally. However, the cost of wireless transmitter and receiver is far higher than that of a wired transmission manner, and wireless transmission is easily interfered by other noise.

Therefore, both the signal transmission using brushes and the signal transmission in a wireless transmission manner have disadvantages.

SUMMARY

Accordingly, the present disclosure is a non-contact measurement signal transmission system. The non-contact measurement signal transmission system is applied to a wheeler device. The wheeler device comprises a body and a rotator. The non-contact signal transmission system comprises a detection device, a first magnetic coupling device, and a pressure sensing device.

The detection device is disposed on the body. The detection device generates an alternating current (AC) signal.

The first magnetic coupling device comprises a first primary side and a first secondary side. The first magnetic coupling device receives the AC signal at the first secondary side and emits a magnetic coupling signal from the first primary side.

The pressure sensing device is disposed on the rotator. The pressure sensing device is electrically connected to the first primary side, and receives the magnetic coupling signal. The pressure sensing device comprises a forced portion and a base. The pressure sensing device responds and transmits a feedback signal to the first primary side according to a relative position of the forced portion and the base. The detection device outputs a forced signal according to the feedback signal transmitted by the first magnetic coupling device.

In addition, the present disclosure further provides a non-contact measurement signal transmission method. The method is applied to a wheeler device. The wheeler device comprises a body and a rotator. The rotator comprises a pressure sensing device, and the body comprises a detection device. A signal is transmitted between the body and the rotator by a first magnetic coupling device in a non-contact manner. The method comprises the following steps: generating and transmitting an AC signal to the first magnetic coupling device by the detection device; converting the AC signal into a magnetic coupling signal by the first magnetic coupling device; receiving the magnetic coupling signal and responding with a feedback signal according to a displacement degree by the pressure sensing device; and outputting a forced signal according to the feedback signal.

With the non-contact measurement signal transmission system and the method thereof provided in the present disclosure, a signal can be transmitted through a rotation surface in a non-contact manner. Therefore, a measurement signal is transmitted without significantly changing the structure of a bicycle, so as to overcome the disadvantages of transmitting a signal by using brushes or in a wireless transmission manner in the prior art.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The detailed features and advantages of the present disclosure are described below in great detail through the following embodiments, and the content of the detailed description is sufficient for those skilled in the art to understand the technical content of the present disclosure and to implement the present disclosure accordingly. Based on the content of the specification, the claims, and the drawings, those skilled in the art can easily understand the present disclosure.

Figure 1:
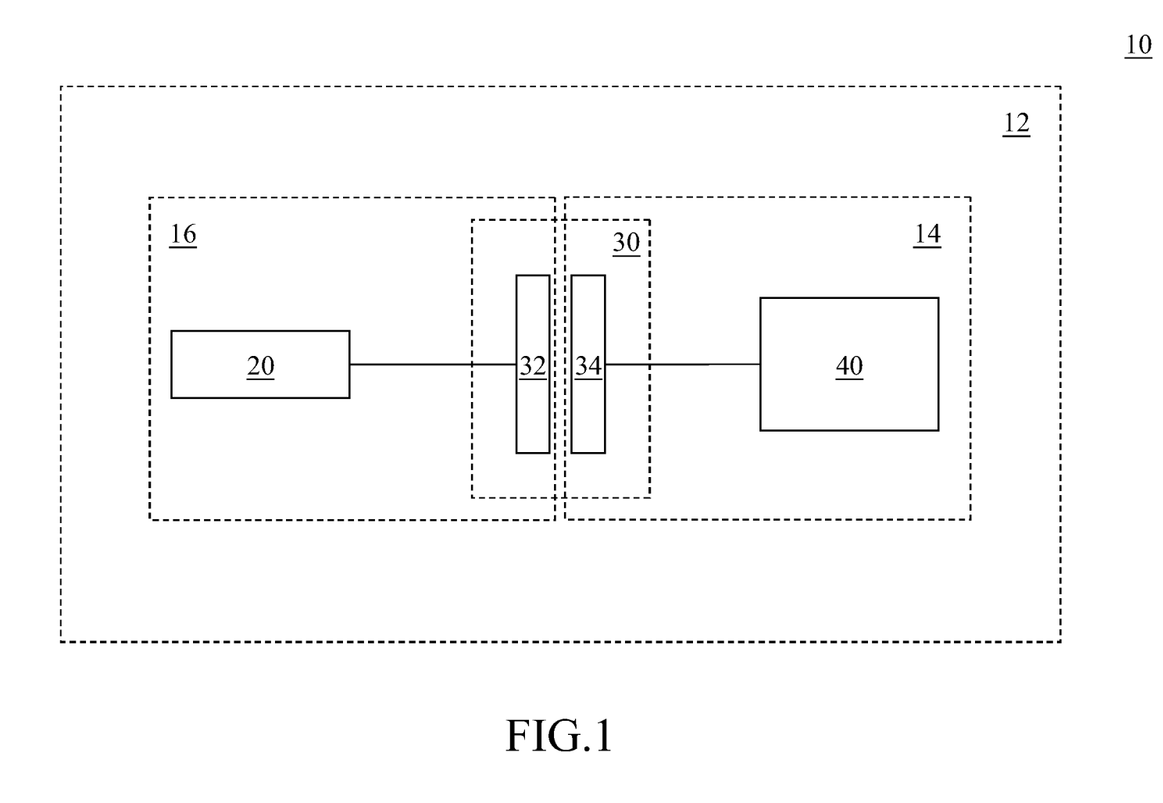
FIG. 1 is a block diagram of a system in a first embodiment of the present disclosure.

Referring to FIG. 1, a circuit block diagram of a system in a first embodiment of the present disclosure is shown. The present disclosure provides a non-contact measurement signal transmission system 10. The non-contact measurement signal transmission system 10 is applied to a wheeler device 12. The wheeler device 12 may be, for example, but not limited to, a bicycle or a wheelchair. The wheeler device 12 may have an electric power assisted system in an active form. The wheeler device 12 comprises a body 14 and a rotator 16 (also referred to as a moving body). The rotator 16 is pivoted to the body 14, and the rotator 16 is rotatable relative to the body 14.

The non-contact measurement signal transmission system 10 comprises a pressure sensing device 20, a first magnetic coupling device 30, and a detection device 40.

The pressure sensing device 20 is disposed on the rotator 16. A user may apply an external force to the pressure sensing device 20, so that the electric power assisted system correspondingly provides an auxiliary power according to the external force applied by the user.

The first magnetic coupling device 30 comprises a first primary side 32 and a first secondary side 34. The first primary side 32 and the first secondary side 34 are magnetically coupled in a non-contact manner. The first primary side 32 is electrically connected to the pressure sensing device 20, and the first secondary side 34 is electrically connected to the detection device 40. The first magnetic coupling device 30 receives an AC signal at the first secondary side 34 and emits a magnetic coupling signal from the first primary side 32.

The detection device 40 is arranged on the body 14 and generates an AC signal. The AC signal may be generated by an oscillator. In addition, the detection device 40 has a fixed impedance component. In this embodiment, the fixed impedance component may be formed by, but not limited to, connecting in series a resistor and a capacitor. The circuit structure will be described later.

Figure 2A:
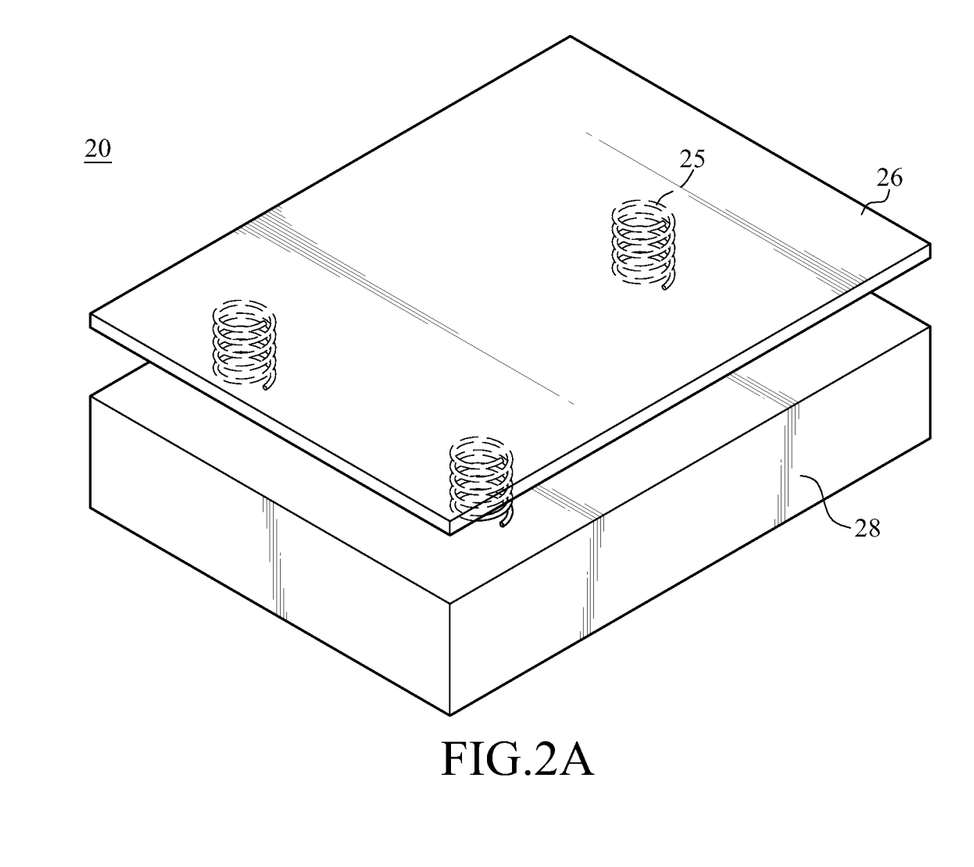
FIGS. 2A, 2B, and 2C are schematic outside views of a pressure sensing device in the present disclosure.
Figure 2B:
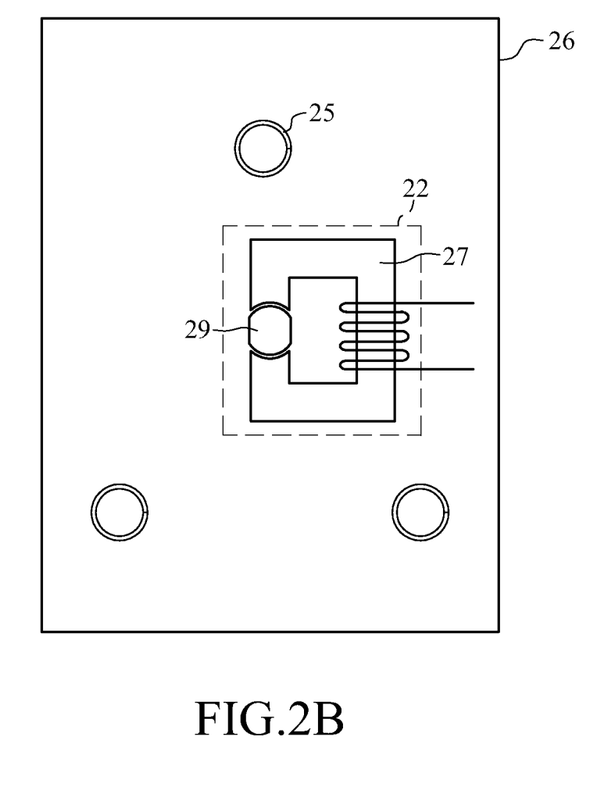
Figure 2C:
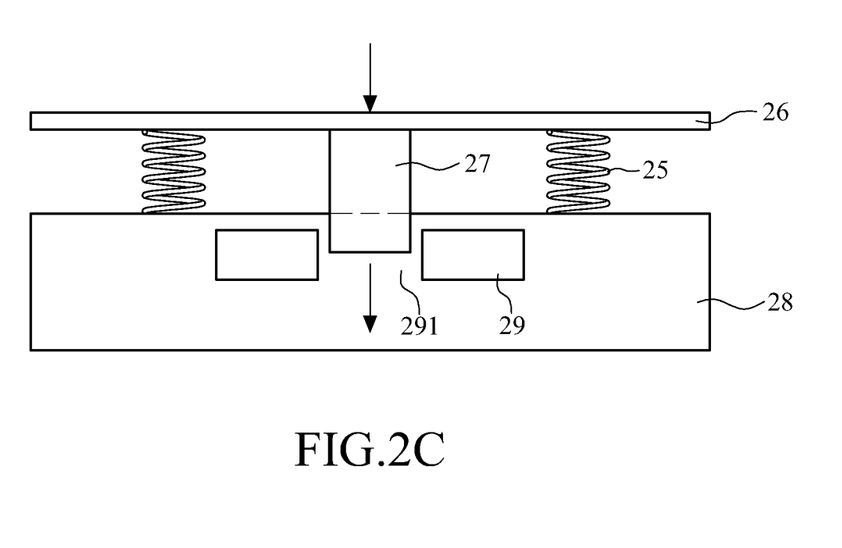

Referring to FIGS. 2A, 2B, and 2C, schematic outside views of the pressure sensing device in the present disclosure are shown. The pressure sensing device 20 comprises a forced portion 26 and a base 28. In this embodiment, the forced portion 26 is a plate. The forced portion 26 and the base 28 are connected to each other through a plurality of elastic members 25. The base 28 is fixed to the rotator 16, and the forced portion 26 may move freely in one direction under the external force. Within an elastic limit of the elastic member, a length change of the elastic member is in direct proportion to a force that the elastic member is subjected to. Therefore, the external force applied by the user to the forced portion 26 is in direct proportion to a relative displacement of the forced portion 26.

The pressure sensing device 20 further comprises a variable impedance component 22. The variable impedance component 22 may be a variable inductor or a variable capacitor. In this embodiment, a variable inductor is taken as an example of the variable impedance component 22. The variable impedance component 22 comprises a first magnetic conductive element 29 and a second magnetic conductive element 27. The first magnetic conductive element 29 is located in the base 28, and the second magnetic conductive element 27 is located on the forced portion 26. The first magnetic conductive element 29 has an air gap 291, and the second magnetic conductive element 27 is disposed at a position corresponding to the air gap 291. The part of the first magnetic conductive element 29 at the air gap 291 is a magnetic conductive space. When the second magnetic conductive element 27 is located in the magnetic conductive space, and a distance between the first magnetic conductive element 29 and the second magnetic conductive element 27 is smaller than a spacing, the first magnetic conductive element 29 and the second magnetic conductive element 27 may form a magnetizer. When the second magnetic conductive element 27 moves, a size of the magnetizer is changed, and the size of the magnetizer influences a value of a magnetic flux. The value of the magnetic flux changes an impedance of the variable impedance component 22. Therefore, when the forced portion 26 is displaced, the second magnetic conductive element 27 moves accordingly, thereby changing the impedance of the variable impedance component 22. Therefore, the impedance (inductance) of the variable impedance component 22 varies with a forced degree of the forced portion 26.

Figure 3:
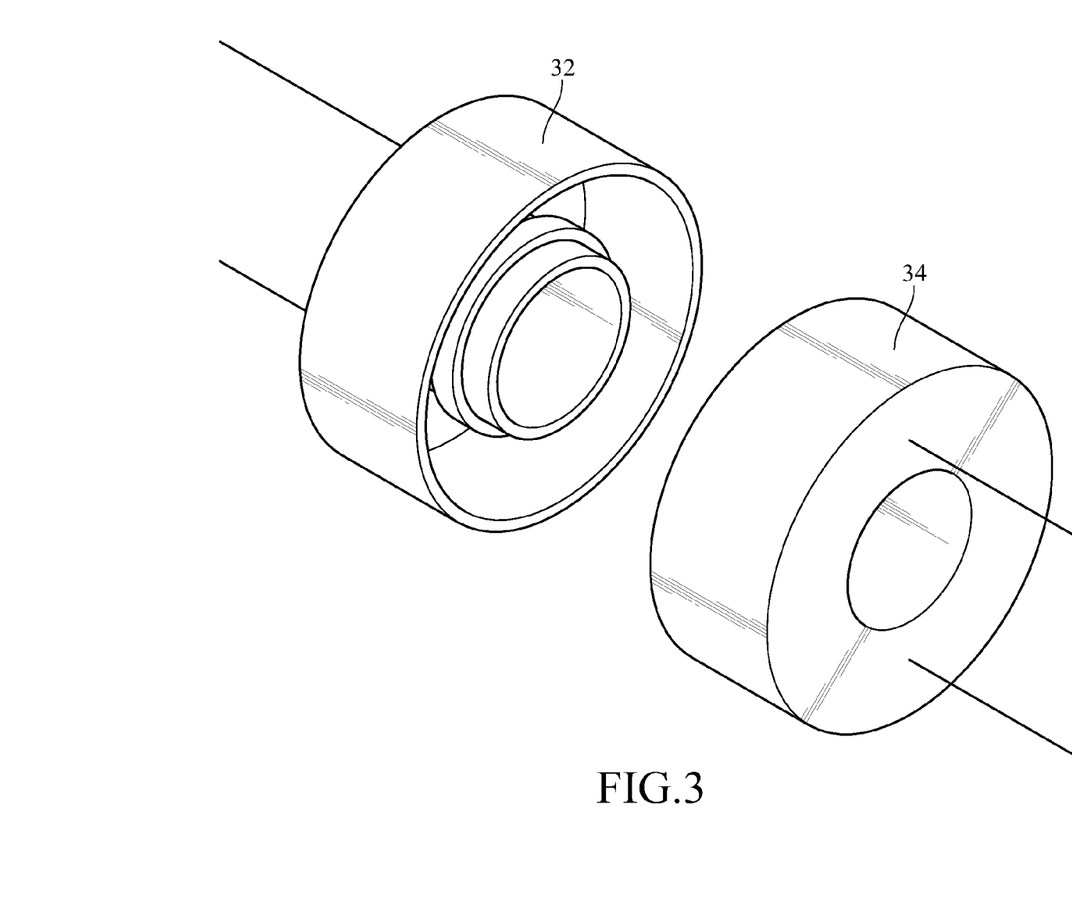
FIG. 3 is a schematic outside view of a first magnetic coupling device in the present disclosure.

Referring to FIG. 3, a schematic outside view of the first magnetic coupling device is shown.

The first primary side 32 and the first secondary side 34 respectively have a conductor coil, and the two conductor coils are disposed corresponding to each other. The two conductor coils may be circular coils. The principle for the first magnetic coupling device 30 to transmit an electromagnetic signal is similar to that of a transformer. An alternating current passing through the first primary side 32 generates a varying magnetic field. The varying magnetic field generates an induced electromotive force on the first secondary side 34, and generates the magnetic coupling signal in a loop formed by the first secondary side 34.

When the first primary side 32 and the first secondary side 34 produce a rotational movement about a central axis (or referred to as a rotation axis), the conductor coil maintains a constant magnetic coupling factor. That is to say, the conductor coil does not cause the change of a magnetic circuit due to the rotational movement produced by the first primary side 32 and the first secondary side 34. The detection device 40 may transmit the magnetic coupling signal to the pressure sensing device 20 through the first magnetic coupling device 30. A feedback signal is generated after the magnetic coupling signal passes through the pressure sensing device 20, in response to the change of the impedance of the pressure sensing device 20. The detection device 40 then detects the pressure sensing device 20 to generate a forced signal according to a change value of the feedback signal in amplitude or phase. The forced signal represents a forced degree of the pressure sensing device 20. Thus, the force degree of the pressure sensing device 20 may be transferred to the detection device 40 through a rotation surface.

Figure 4:
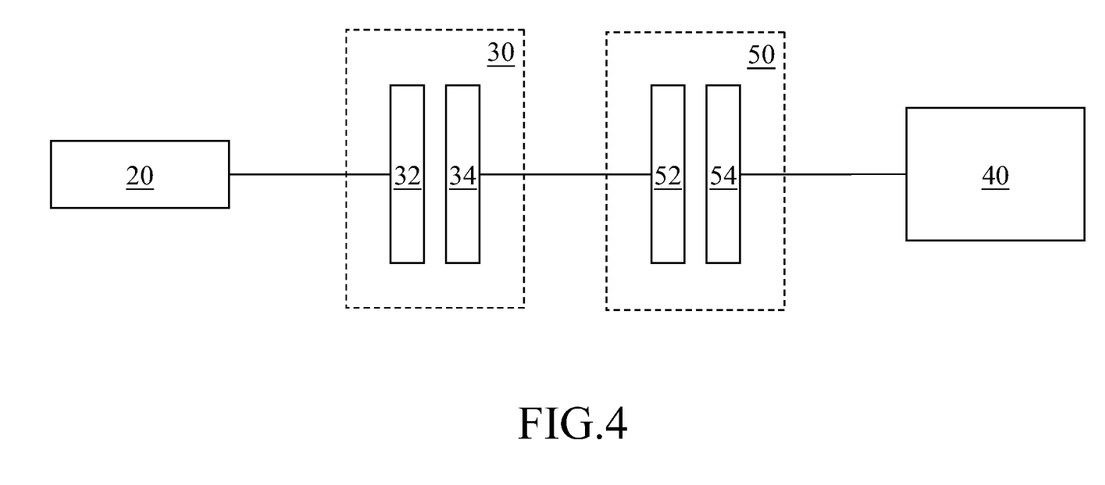
FIG. 4 is a block diagram of a system in a second embodiment of the present disclosure.

Referring to FIG. 4, a block diagram of a system in a second embodiment of the present disclosure is shown. In this embodiment, the non-contact measurement signal transmission system 10 further comprises a second magnetic coupling device 50. The second magnetic coupling device 50 is electrically connected between the first magnetic coupling device 30 and the detection device 40. The second magnetic coupling device 50 comprises a second primary side 52 and a second secondary side 54. The second primary side 52 is electrically connected to the first secondary side 34, and the second secondary side 54 is electrically connected to the detection device 40.

In this embodiment, since the non-contact measurement signal transmission system 10 has two magnetic coupling devices (the first magnetic coupling device 30 and the second magnetic coupling device 50), a signal of the non-contact measurement signal transmission system 10 may be transmitted through two rotation surfaces in a non-contact manner.

Figure 5A:
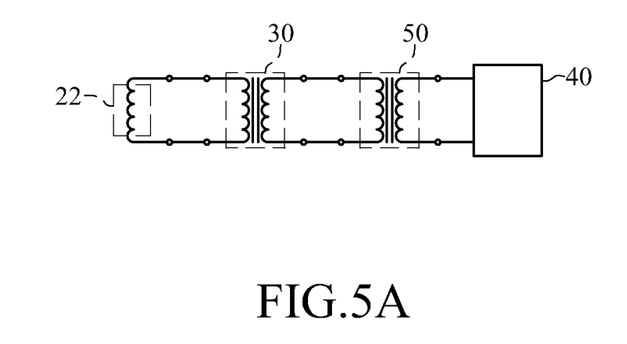
FIG. 5A is an equivalent circuit diagram illustrating a connection relationship in the second embodiment of the present disclosure.
Figure 5B:
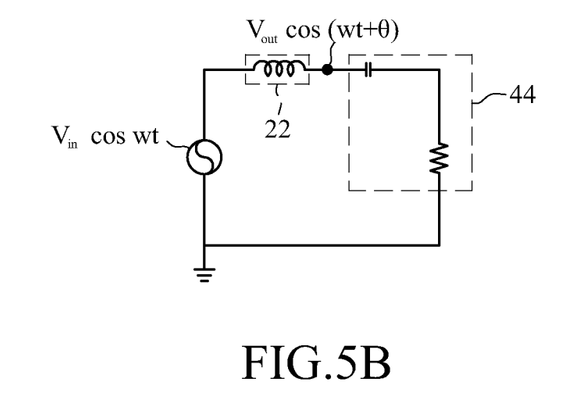
FIG. 5B is an equivalent circuit diagram illustrating circuit elements in the second embodiment of the present disclosure.

Referring to FIGS. 5A and 5B, FIG. 5A is an equivalent circuit diagram illustrating a connection relationship in the second embodiment of the present disclosure, and FIG. 5B is an equivalent circuit diagram illustrating circuit elements in the second embodiment of the present disclosure.

The variable impedance component 22 in FIG. 5A is equivalently connected to the circuit of the detection device 40 through two magnetic coupling devices (the first magnetic coupling device 30 and the second magnetic coupling device 50). Therefore, the equivalent circuit may be further simplified as the circuit in FIG. 5B.

The AC signal in FIG. 5B is a sine wave, and the mathematical expression thereof may be $V_{in} \times \cos(\omega \times t)$, where $V_{in}$ is an amplitude of the AC signal, $\omega$ is an angular frequency, and t represents time. The variable impedance component 22 and a fixed impedance component 44 may be equivalent to an equivalent circuit formed by connecting in series a resistor, an inductor, and a capacitor. The detection device 40 may detect a voltage on a node between the capacitor and the inductor as a feedback signal, or detect a voltage on a node between the capacitor and the resistor as the feedback signal. The mathematical expression of the feedback signal is $V_{out} \times \cos(\omega \times t + \theta)$, where $V_{out}$ is an amplitude of the AC signal, and $\theta$ is a phase shift.

Figure 6A:
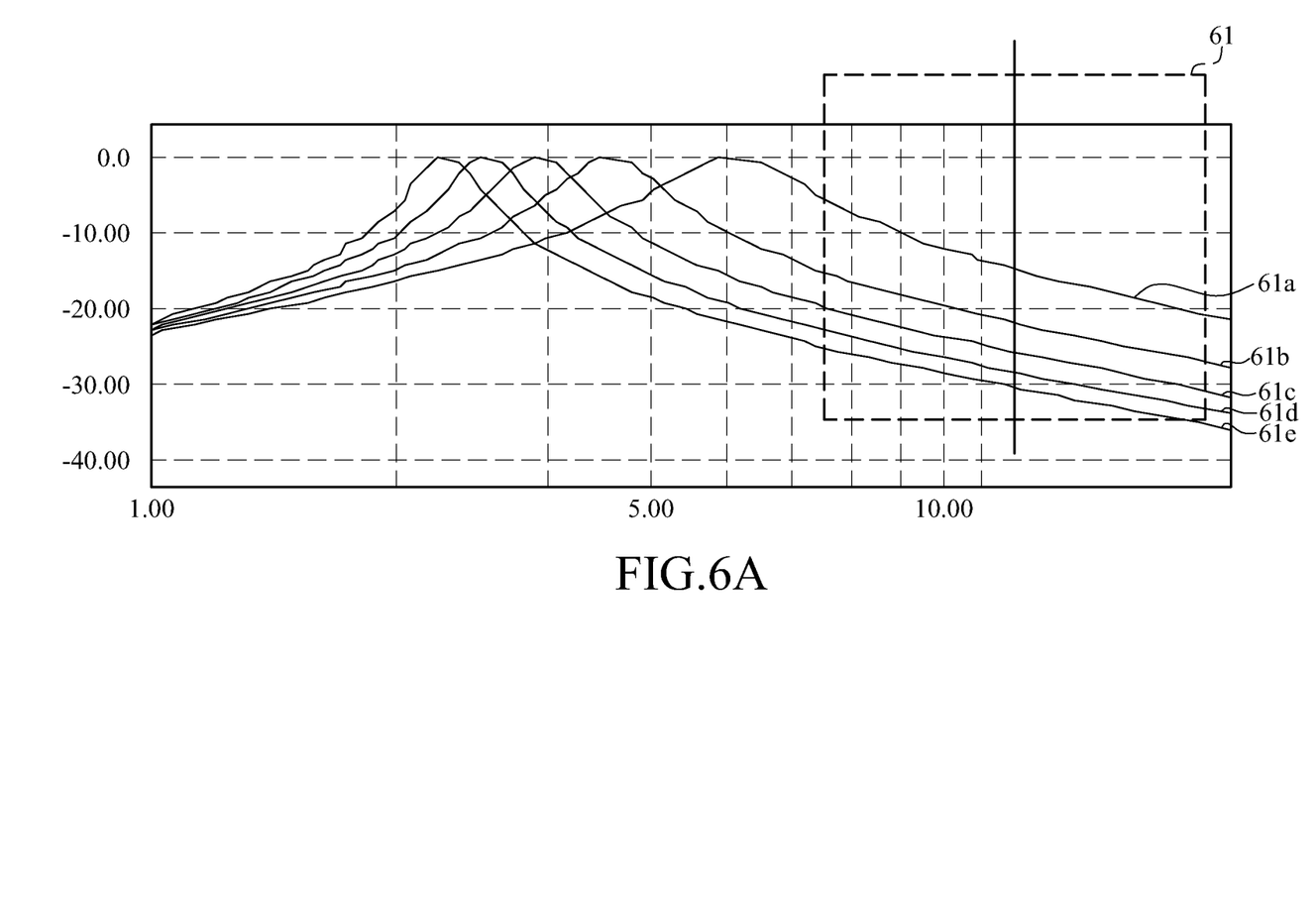
FIG. 6A is an amplitude-frequency response diagram.
Figure 6B:
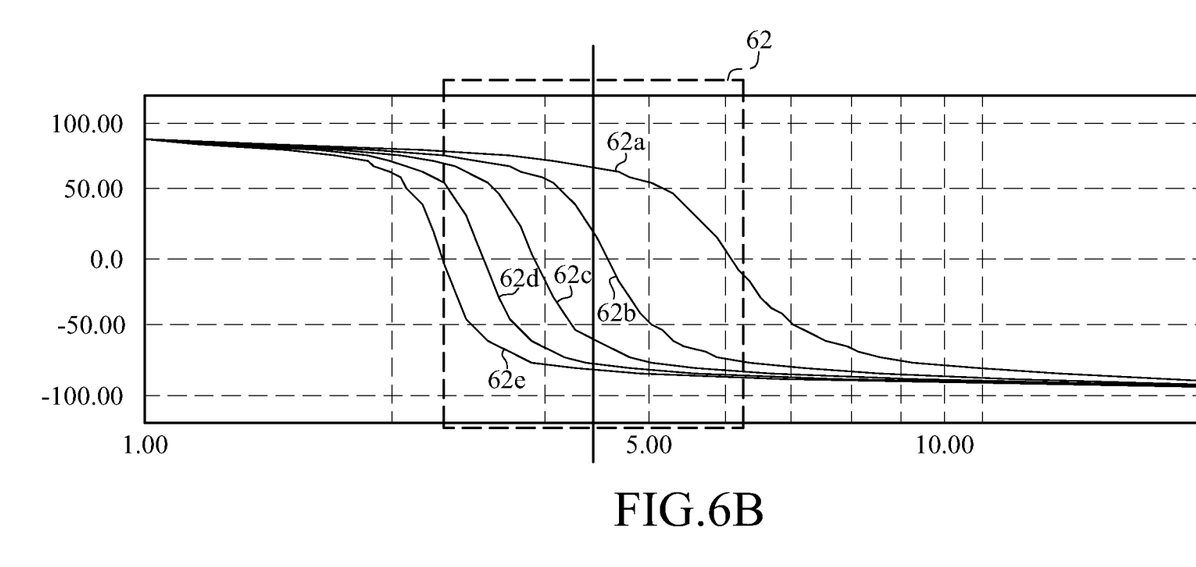
FIG. 6B is a phase-frequency response diagram.

Referring to FIGS. 6A and 6B, FIG. 6A is an amplitude-frequency response diagram, and FIG. 6B is a phase-frequency response diagram.

FIGS. 6A and 6B show corresponding results obtained through experiments with a resistance of 10Ω and a capacitance of 0.1 uF. In FIGS. 6A and 6B, line segments 61a and 62a represent frequency response corresponding to 10 mH, line segments 61b and 62b represent frequency response corresponding to 20 mH, line segments 61c and 62c represent frequency response corresponding to 30 mH, line segments 61d and 62d represent frequency response corresponding to 40 mH, and line segments 61e and 62e represent frequency response corresponding to 50 mH.

In FIG. 6A, the vertical axis represents an amplitude with a unit of decibel (dB), the horizontal axis is a logarithmic coordinate axis, and the horizontal axis represents a frequency with a unit of kHz. The area represented by a block 61 is an amplitude resolvable area. In the amplitude resolvable area, the amplitude corresponding to each line segment has an interval from each other. Moreover, the amplitude corresponding to each line segment is in positive correlation with an impedance. Therefore, the detection device 40 may generate an AC signal of a corresponding frequency in the amplitude resolvable area, and detect amplitude thereof. The detection device 40 may then use a table lookup method to search for the impedance according to the amplitude, so as to be corresponding to the forced degree of the pressure sensing device 20.

In FIG. 6B, the vertical axis represents a phase with a unit of degree, the horizontal axis is a logarithmic coordinate axis, and the horizontal axis represents a frequency with a unit of kHz. In FIG. 6B, the area represented by a block 62 is a phase resolvable area. In the phase resolvable area, the phase shift corresponding to each line segment has an interval from each other. Moreover, the phase corresponding to each line segment is in positive correlation with a capacitance. Therefore, the detection device 40 may generate an AC signal of a corresponding frequency in the phase resolvable area, and detect a phase thereof. The detection device 40 may then use a table lookup method to search for the capacitance according to the phase shift, so as to be corresponding to the forced degree of the pressure sensing device 20.

Figure 7:
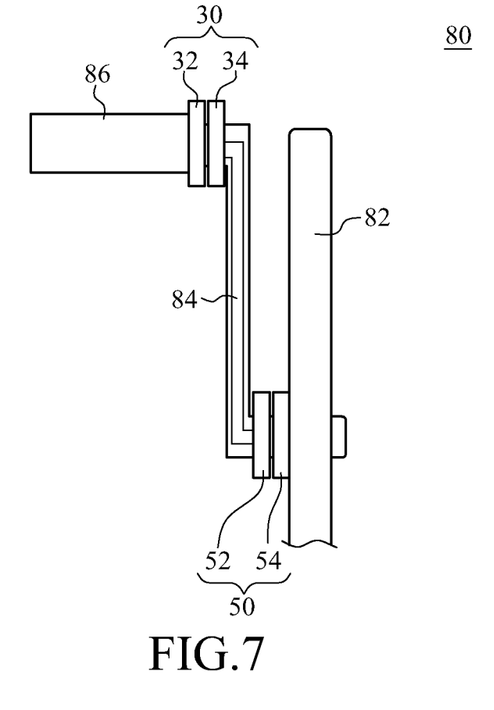
FIG. 7 is a schematic view illustrating an application of the first embodiment of the present disclosure.

Referring to FIG. 7, a schematic view illustrating an application of the first embodiment of the present disclosure is shown. The non-contact measurement signal transmission system 10 provided in the present disclosure may be applied to a bicycle 80. The bicycle 80 comprises a frame 82, a crank 84, and a pedal 86. The pedal 86 is pivoted on the crank 84, and the crank 84 is also pivoted on the frame 82. The body 14 is disposed on the frame 82, and the rotator 16 is disposed on the pedal 86.

The first primary side 32 is disposed on the pedal 86, and the first secondary side 34 is disposed on the crank 84, so that the pedal 86 and the crank 84 may transmit a signal to each other through the first magnetic coupling device 30. The second primary side 54 is disposed on the crank 84, and the second secondary side 56 is disposed on the frame 82, so that the crank 84 and the frame 82 may transmit a signal to each other through the second magnetic coupling device 50. The pedal 86 has the pressure sensing device 20 thereon. The pressure sensing device 20 may sense a pedaling force of a rider, and for the sensing result, a signal is transmitted to the detection device 40 on the frame 82 through the first magnetic coupling device 30 and the second magnetic coupling device 50 in a non-contact manner. The detection device 40 may convert the detection result into a measurement signal and then transmit the measurement signal to the electric power assisted system. The electric power assisted system may decide a power to be correspondingly output to the bicycle 80 according to the measurement signal.

When the present disclosure is applied to the bicycle 80, it is only necessary to mount the pressure sensing device 20 on the pedal 86, and to add the first magnetic coupling device 30 and the second magnetic coupling device 50 at a pivotal connection part, so as to detect a pedaling force by using the pedal 86. Therefore, the present disclosure can be directly integrated in the current existing bicycle 80 without significantly changing the structure of the bicycle. Even if the pressure sensing device 20 fails, the riding performance of the bicycle 80 is not affected.

Figure 8A:
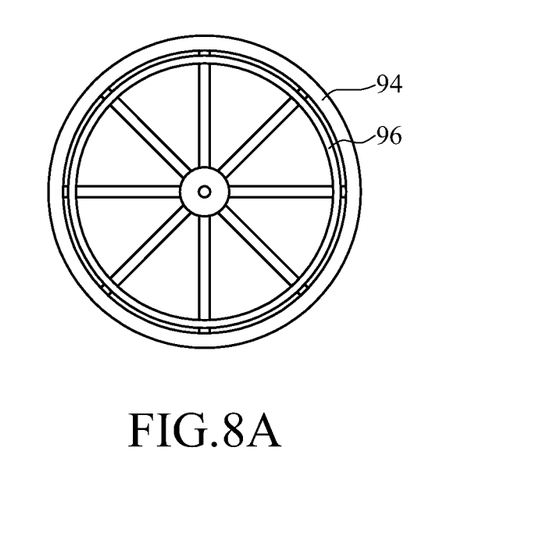
FIGS. 8A and 8B are schematic views illustrating an application of the second embodiment of the present disclosure.
Figure 8B:
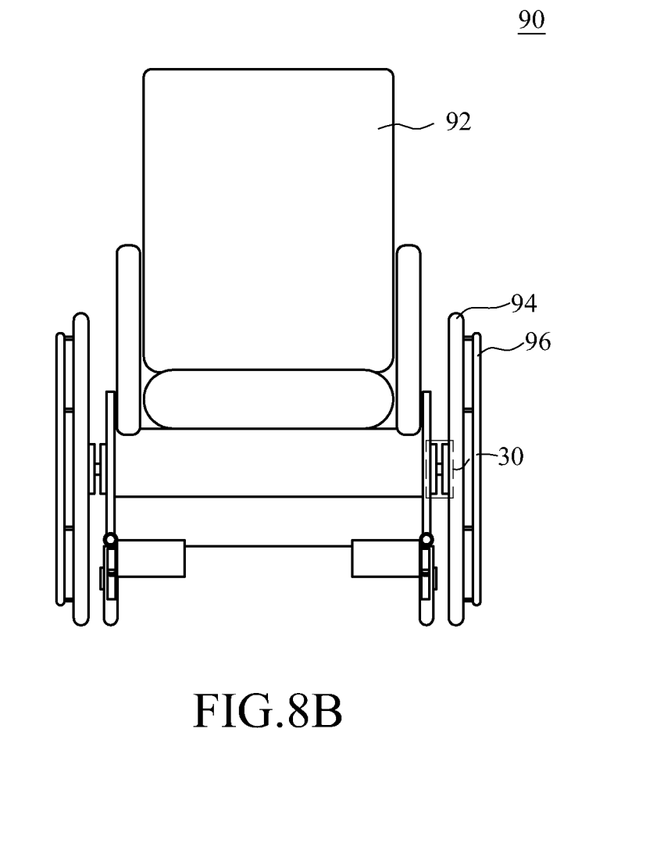

Referring to FIGS. 8A and 8B, schematic views illustrating an application of the second embodiment of the present disclosure are shown. The non-contact measurement signal transmission system 10 provided in the present disclosure may be applied to a wheelchair 90. The wheelchair 90 comprises a body 92, a tire 94, and a hand wheel 96.

In an embodiment, the tire 94 is pivoted to the body 92, and the hand wheel 96 is fixed to the tire 94, for example, an inner side or a shaft portion of the tire 94, with an elastomer (not shown). A user may apply a force to the hand wheel 96 to drive the tire 94 forward. At this time, since the elastomer is disposed, the hand wheel 96 and the tire 94 produce a relative displacement. Within an elastic limit of the elastomer, the relative displacement between the hand wheel 96 and the tire 94 is in direct proportion to the force applied by the user. The pressure sensing device 20 is disposed on the hand wheel 96, so as to sense the force applied by the user through the relative displacement between the hand wheel 96 and the tire 94. The first magnetic coupling device 30 is disposed at a pivotal connection part between the body 92 and the tire 94. The detection device 40 is disposed on the body 92.

The pressure sensing device 20 senses a pushing force of the user, and transfers the sensing result to the detection device 40 through the first magnetic coupling device 30 in a non-contact manner. Consequently, a power assisted system of the wheelchair 90 can generate a corresponding power according to the pushing force of the user.

Figure 9:
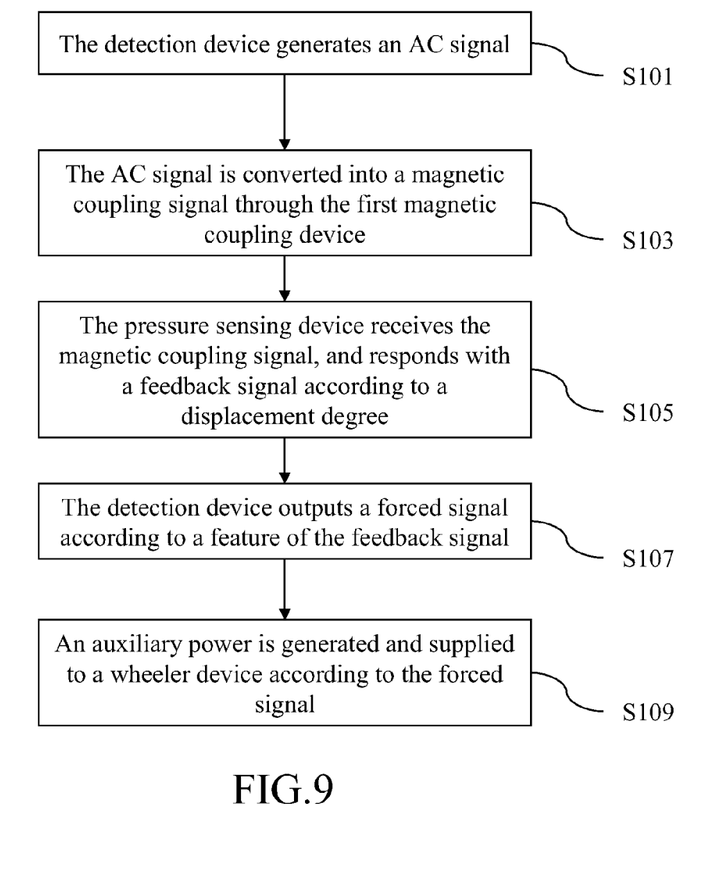
FIG. 9 is a view of a non-contact measurement signal transmission method provided in the present disclosure.

Referring to FIG. 9, a non-contact measurement signal transmission method provided in the present disclosure is shown. The method is applied to the non-contact measurement signal transmission system 10 in FIG. 1.

In Step S101, the detection device 40 generates an AC signal. The AC signal may be generated by an oscillator. The AC signal may then be transmitted to the first magnetic coupling device 30.

In Step S103, the AC signal is converted into a magnetic coupling signal through the first magnetic coupling device 30. The first magnetic coupling device 30 is disposed on a rotation surface, and may transmit a signal in a non-contact manner.

In Step S105, the pressure sensing device 20 receives the magnetic coupling signal, and responds with a feedback signal according to a displacement degree. When a user applies an external force to the pressure sensing device 20, an impedance of the variable impedance component 22 in the pressure sensing device 20 is changed, so that the amplitude and phase of the AC signal are changed accordingly. The signal flowing through the variable impedance component 22 and being output is the feedback signal.

In Step S107, the feedback signal is transmitted to the detection device 40 by the first magnetic coupling device 30, and the detection device 40 outputs a forced signal according to a feature of the feedback signal.

In an embodiment of the present disclosure, according to a gain of a feedback signal, the detection device 40 searches for a forced signal corresponding to the gain in a lookup table. In an embodiment of the present disclosure, according to a phase of a feedback signal, the detection device 40 searches for a forced signal corresponding to the phase in a lookup table. Afterwards, the detection device 40 will output the searched out forced signal.

In an embodiment of the present disclosure, the method further comprises Step S109, in which an auxiliary power is generated and supplied to a wheeler device according to the forced signal.

What is claimed is:

1. A non-contact measurement signal transmission system, applied to a wheeler device, wherein the wheeler device comprises a body and a rotator, and the rotator rotates relative to the body, the system comprising:
   a detection device, disposed on the body, for generating an alternating current (AC) signal;
   a first magnetic coupling device, comprising a first primary side and a first secondary side, wherein the first magnetic coupling device receives the AC signal at the first secondary side and emits a magnetic coupling signal from the first primary side; and
   a pressure sensing device, disposed on the rotator and electrically connected to the first primary side, for receiving the magnetic coupling signal, wherein the pressure sensing device comprises a forced portion and a base, the pressure sensing device responds and transmits a feedback signal to the first primary side according to a relative position of the forced portion and the base, and the detection device outputs a forced signal according to the feedback signal transmitted by the first magnetic coupling device.

2. The non-contact measurement signal transmission system according to claim 1, wherein the first primary side and the first secondary side of the first magnetic coupling device each has a conductor coil, and when the first primary side and the first secondary side produce a rotational movement about a central axis, the conductor coil maintains a constant magnetic coupling factor.

3. The non-contact measurement signal transmission system according to claim 1, further comprising a second magnetic coupling device, the second magnetic coupling device is electrically connected between the first magnetic coupling device and the detection device, the second magnetic coupling device comprises a second primary side and a second secondary side, and the second magnetic coupling device receives the AC signal from the detection device through the second secondary side, and transmits the AC signal to the first secondary side through the second primary side.

4. The non-contact measurement signal transmission system according to claim 3, wherein the wheeler device is a bicycle, the bicycle comprises a frame, a crank, and a pedal, the body is disposed on the frame, the rotator is disposed on the pedal, the pedal is pivoted to the crank, the crank is pivoted to the frame, the pedal has the pressure sensing device and the first primary side, the crank has the first secondary side and the second primary side, the frame has the second secondary side and the detection device, and the pressure sensing device transmits the forced signal to the detection device through the first magnetic coupling device and the second magnetic coupling device in a non-contact manner.

5. The non-contact measurement signal transmission system according to claim 1, wherein the base comprises a first magnetic conductive element, the first primary side is electrically connected to the first magnetic conductive element, the forced portion comprises a second magnetic conductive element, and when the second magnetic conductive element moves, a size of a magnetizer is changed, so as to change an inductance of the first magnetic conductive element.

6. The non-contact measurement signal transmission system according to claim 1, wherein the detection device outputs the forced signal according to an amplitude of the feedback signal at a specific frequency.

7. The non-contact measurement signal transmission system according to claim 1, wherein the detection device outputs the forced signal according to a phase shift of the feedback signal at a specific frequency.

8. A non-contact measurement signal transmission method, applied to a wheeler device, wherein the wheeler device comprises a body and a rotator, the rotator comprises a pressure sensing device, the body comprises a detection device, and a first magnetic coupling device is provided between the body and the rotator, the method comprising:
   generating and supplying an alternating current (AC) signal to the first magnetic coupling device by the detection device;
   converting the AC signal into a magnetic coupling signal by the first magnetic coupling device;
   receiving the magnetic coupling signal and responding with a feedback signal according to a displacement degree by the pressure sensing device;
   transmitting the feedback signal to the detection device by the first magnetic coupling device; and
   outputting a forced signal according to a feature of the feedback signal by the detection device.

9. The non-contact measurement signal transmission method according to claim 8, wherein the step of outputting the forced signal according to the feature of the feedback signal by the detection device further comprises:
   outputting the forced signal according to a gain of the feedback signal and a lookup table.

10. The non-contact measurement signal transmission method according to claim 8, wherein the step of outputting the forced signal according to the feature of the feedback signal by the detection device further comprises:
   outputting the forced signal according to a phase of the feedback signal and a lookup table.

11. The non-contact measurement signal transmission method according to claim 8, further comprising:
   generating and supplying an auxiliary power to the wheeler device according to the forced signal.

* * * * *